April 26, 1927. 1,626,586
F. D. SPRAGUE
AUTOMATIC BRAKE CONTROL APPARATUS
Filed Nov. 20, 1923 3 Sheets-Sheet 1
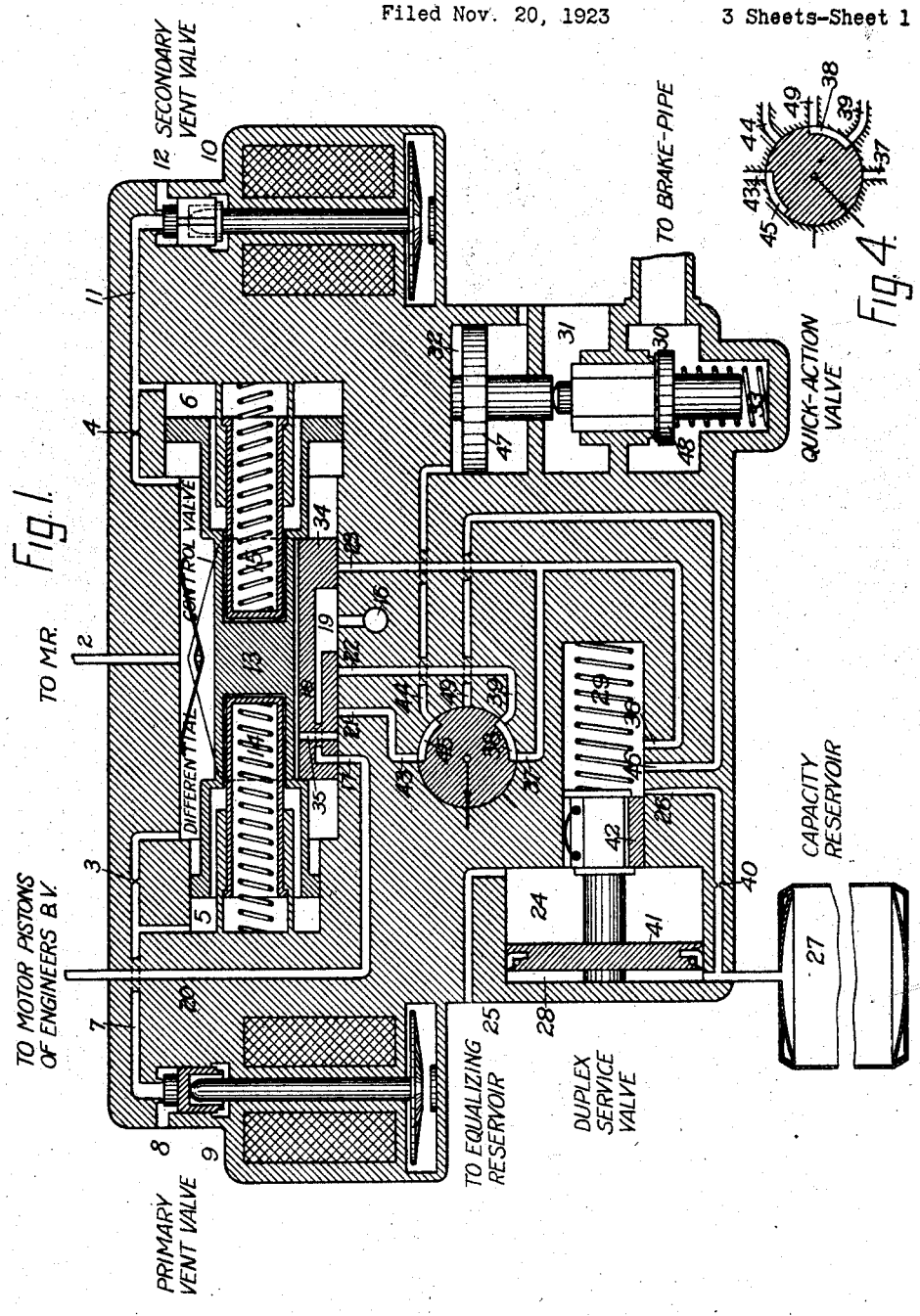
WITNESSES.
INVENTOR.
Frank Desmond Sprague,
BY
ATTORNEYS.

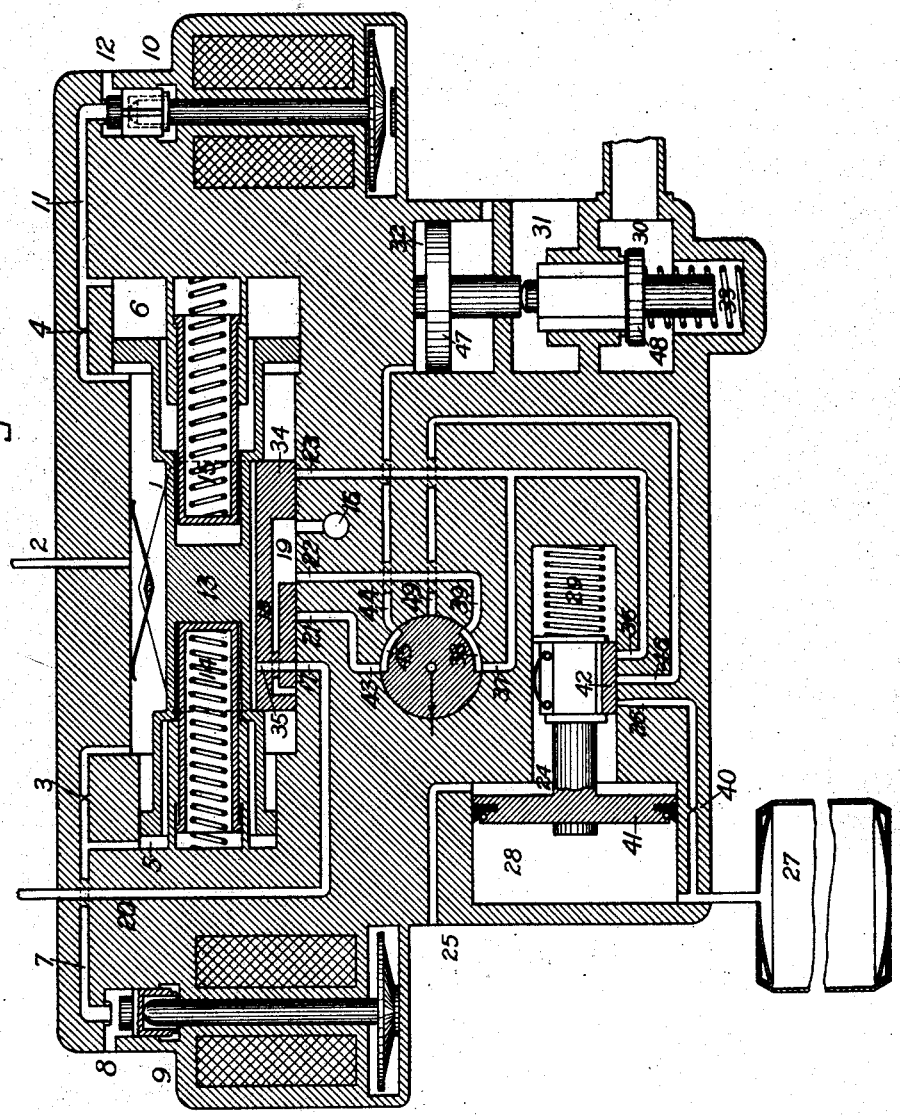

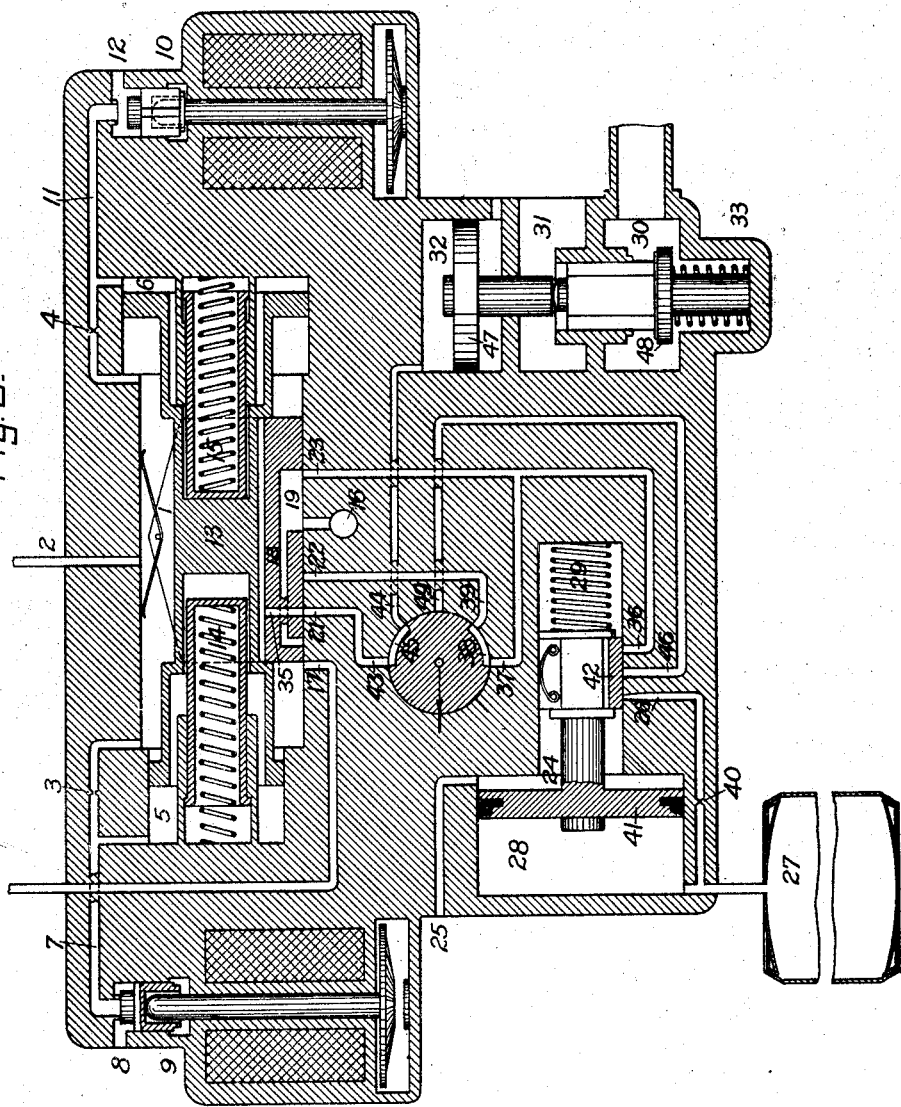

Patented Apr. 26, 1927.

1,626,586

UNITED STATES PATENT OFFICE.

FRANK DESMOND SPRAGUE, OF BROOKLYN, NEW YORK.

AUTOMATIC BRAKE-CONTROL APPARATUS.

Application filed November 20, 1923. Serial No. 675,853.

This invention relates to an improved brake controlling apparatus designed to be set in operation by impulses transmitted from the track in accordance with, and governed by, certain conditions of the track circuit.

The special function of this apparatus, which for convenience will hereinafter be referred to as the control valve, is to properly utilize the impulse so transmitted, and to act as a selective translating medium between such impulse and the locomotive and train brake system.

It is a desirable feature of such apparatus that the character of the brake application shall be duly co-ordinated to the existent traffic, load and grade conditions, and accordingly it is one of the objects of my invention to provide a device which may be operated from the track to effect a braking of selected predetermined amount for proper reduction of train speed when passing a caution signal or its equivalent and to cause an amplified application of the brakes sufficient to bring the train to a stop when passing a point a definite distance to the rear of the stop signal.

On the large majority of automatic train control devices heretofore developed the principal thought has been placed on the transmission of the controlling impulse between the track and the moving train. Such impulse being received, it was generally considered sufficient to utilize it to open some simple form of brake pipe vent valve and exhaust the brake pipe air direct to atmosphere.

The automatic venting of the train line of the air brake system, as heretofore practiced in many train controlling mechanisms, either exhausts practically all pressure in the train line, or so reduces the train line pressure that a considerable loss of time ensues before the train can proceed after getting an automatic stop application, because the brakes cannot be released until the pressure in the train line has been restored.

Another difficulty in the operation of the air brake mechanism in automatic train controlling devices arises from the fact that the pressure utilized in practice for the control of the air brakes is not uniform, for example:

A freight engine might operate with one hundred pounds pressure in the main reservoir and eighty pounds pressure in the train line, whereas in passenger service greater pressures are necessary because of higher speed, so that if a valve mechanism is employed that is suitable for use in freight service that valve would be unsuitable when the same engine is used in passenger service, as is sometimes necessary.

Still another difficulty encountered by an automatic train control device is the varied character of the trail load back of the locomotive, as well as the wide difference in speed and grade conditions met with under service conditions.

It may be easily understood that the method used in braking on high speed steel passenger trains, the cars of which are equipped with PC or UC valves, is entirely different from what will be demanded in handling a 100-car freight. On the passenger train one can resort to heavy service and emergency braking, while on the freight the first application must be comparatively light, in order to allow the brake rigging to equalize and the slack to adjust. Under certain conditions this first service reduction may be amplified, while under others it will be necessary to allow the first application to remain in force until the train has come to a stop. Again, it is sometimes necessary to apply brakes to the trail load alone while the locomotive brakes are manually released, so that the engine may drag out the head end, thus preventing undue run-in of slack, while under other conditions a reverse of this action will be required.

A still further difficulty met with in railroad operation arises from the necessity of shifting freight locomotives to passenger service or vice versa under certain conditions. The satisfactory control mechanism will allow the automatic brake action to be changed as demanded by the exigencies of the service.

When one considers the problems as presented by freight and passenger trains operating at various speeds, on level and grade, and the different loadings, it is apparent that the simple form of brake pipe vent valve is unable to meet the requirements.

A further object, therefore, of my invention is to furnish a control valve capable of providing multiple and different degrees of service as well as emergency braking. The degree of service braking once having been determined it will be definite, irrespective of any fluctuation in brake pipe pressure.

Another object is to provide a control valve so designed as to allow the locomotive to be easily shifted from freight to passenger service or vice versa, with the assurance that the brake action will always be in accordance with the demands thereon.

A still further object of the present invention is to provide a control valve having the aforementioned characteristics, and so designed that a failure to function properly or the breakdown of any part should, as nearly as possible, cause a brake application.

The valve to be described has been designed primarily for operation with an electro-pneumatic train control system actuated by two distinct impulses received from the track at different times. Under normal conditions it will be considered that the first impulse is received at or near the caution indication of a standard block signal system, while the second impulse will be received a suitable distance to the rear of the stop indication. It is a matter of no consequence whether such impulses are received from contact ramps, are transmitted by the fields of permanent track magnets or are the result of fields generated by alternating currents in the traffic rails themselves. In any case, once received on the locomotive it is assumed that proper relays or equivalent mechanism is provided to amplify or translate these impulses.

In order to fully safeguard the train, irrespective of what automatic control system may be used, an engineer should be free at all times to amplify the action of such system in the event of automatic service braking by manually applying additional braking, and should likewise be responsible for the release of all automatically initiated brake applications.

The valve mechanism about to be described is preferably used in conjunction with the electro-pneumatic train control system, patent for which was applied for by Frank J. Sprague, August 7, 1919, Serial No. 315,880 corresponding with British Patent No. 149,922. In that application a centrifugal governor is indicated which is capable of varying the connections of certain electric circuits in accordance with the train's speed. Also a special attachment for the head of the Westinghouse H-6 engineer's valve is illustrated therein, which apparatus by means of fluid pressure actuated motor pistons 2, 2 and yokes 1, 3 mounted on the engineer's valve spindle is capable of automatically moving the rotor of such valve to lap position following the receipt of the control impulse, thus shutting off communication between the main reservoir and the brake pipe. Similar provision is made in application Ser. No. 879,929, filed December 31, 1914, by Frank J. Sprague, corresponding with British Patent No. 18,213 of 1915. In the following description the functions of these two units should be borne in mind.

This invention is, however, presented as an entity for general employment in the art of train control and in the specific form illustrated I have for convenience in description and presentation departed somewhat from the specific showing of the said application Serial No. 315,880, (British Patent No. 149,922). I have found it convenient in presenting this invention, but without intended limitation, to assume a similarity of control of both coils herein illustrated as initiating the operation of the valve structure. Furthermore in the event of application of this invention to the showing of the said Sprague application, Sr. No. 315,880 (British Patent No. 149,922), it will be apparent that all of the Sprague automatic valve structure of the said application would be omitted on replacement by the functions and apparatus of my invention and that other obvious changes would be made.

A preferred form of my invention is shown in the drawings, in which Fig. 1 is a schematic view of the control valve in the normal or running position, and selectively arranged by means to be explained later to furnish heavy service and emergency braking at the first and second track control points respectively.

Figs. 2 and 3 are similar views of the valve after operation in response to a primary and secondary brake application impulse respectively.

Fig. 4 is a view showing the relative positions of the selector device and valve ports when the apparatus is set to furnish light and heavy service braking.

The impulses picked up by the receiving mechanism, and differentiated by the relays of the train control system, are transmitted to my selective brake application valve assembly, and control:

1. Two air vent valves 9 and 10, normally closed, with established openings 8 and 12 respectively to atmosphere from the opposite ends of a chamber 1 in which moves a spring-centered differential valve piston 13 in engagement with a suitably-ported slide valve 34.

These "primary" and "secondary" vent valves are two metal-seated electrically-controlled valves, identical in construction. So long as the coils of both valves are energized main reservoir pressure (supplied to the chamber 1 thru passage 2) is retained in both ends of the differential valve chamber. When the circuit of one or the other is opened the plunger and valve drop under the action of gravity, and main reservoir pressure on the side of the differential valve under control of the vent valve in question is vented to atmosphere via a suitable passage as will later be explained.

2. The differential valve control, which initiates any required combination of light or heavy measured service, or emergency brake applications, varying the automatic applications in accordance with the requirements imposed by the widely differing conditions of train make-up and operation. The variable brake applications just mentioned may be applied to locomotive and train together or to the train alone.

The slide valve 34 referred to is operated by the movement of the differential piston 13, sliding in suitable cylinders, the whole being normally retained in center or running position by means of two helical compression springs 14, 15 whose movement is limited by shouldered sleeves. The differential piston serves as a means to operate mechanism for effecting a drop in brake pipe pressure on movement of the differential piston. In order to effect the variable automatic brake applications above mentioned there is also provided in the assembly a 3. Duplex service valve, by means of which a definite predetermined brake pipe reduction is made irrespective of the initial pressure. This valve is normally adapted to give two degrees of measured service braking in co-ordination with the setting of a selector valve and position of the differential valve, altho, as will be evident from the subsequent description of operation, as many degrees of such braking as required may be given.

Essentially, the mechanism consists of a cylinder and a piston 41 rendered air tight by suitable means, as, for example, a cup leather packing. Normally a balanced air pressure exists on both sides of the piston so that the thrust of a calibrated helical spring 29 keeps it in the release (left hand) position. Pressure air from the equalizing reservoir or brake pipe of the standard brake equipment is supplied by means of a passage 25 to chamber 24 at the right of piston 41 and thence thru passage 26 and restriction 40 to a capacity reservoir 27 and the chamber 28 at the left of piston 41. When air pressure is reduced on the right side of the piston it moves a cut-off slide valve 42 against the resistance of the spring, so that the valve travel is proportional to the pressure drop, and the exhaust ports 46, 36 in the slide valve seat are accordingly lapped following predetermined reductions of equalizing reservoir air.

The port 26 in the slide valve seat is so located as to be uncovered only when the slide valve is in the extreme left hand position. The capacity reservoir communicates at all times with the left side of the piston 41, its function being simply to increase the volume of the cylinder on that side of the piston.

4. The quick-action or emergency valve is a spring-and-air-pressure-seated valve 48 designed for venting brake pipe air to atmosphere thru a large opening. The valve portion proper is opened by means of main reservoir pressure applied on top of an actuating piston 47 from chamber 1 of the differential control valve thru a controlled passage 21, 43, 44 as will later be explained. When this piston is depressed by an application of said pressure a brake pipe atmospheric vent 30 is opened, which is of sufficient size to cause an emergency application of the brakes even though the handle of the engineer's brake valve should be in release position.

5. A selector valve capable of being rotated externally and locked in any one of a number of positions makes possible selective braking; or in other words, allowing the automatic equipment to be so set as to give proper braking irrespective of whether the locomotive is used in high speed passenger or tonnage freight equipment. This selectivity is accomplished by the changed interconnections of certain illustrated air passages controlled by the movement of said selector valve. The selector valve is illustrated as located centrally of the general valve assembly and as provided with cavities 38 and 45 for the purpose just referred to.

All the units above described are self-contained and are independently bolted to a permanent manifold to which all pipe connections are made, so that any unit may be removed without disturbing any other portion or without breaking any pipe connections.

With this valve assembly it is possible readily to vary the results, as for example: On the first track impulse to get either a light service application, or a heavy service application; and on the second track impulse either a heavy service application, or an emergency application; and such braking may be made effective on both the locomotive and trail load or on the trail load alone. It should be borne in mind that the combinations above indicated are for purposes of illustration only, and that in manufacture they may be varied from the outline given by a re-arrangement of the ports of the selector valve.

The valve assembly thus briefly described is applicable to any kind of standard brake equipment. Being of the universal type it may be utilized on either freight or passenger service, and it will operate efficiently whether exhausting from the equalizing reservoir or direct from the brake pipe in making service applications.

Despite its numerous possible functions it is simple in construction and absolutely reliable in operation. It is physically of identically the same general character as other parts of the regular air brake systems and requires like attention and care. In case of necessity it may be immediately cut off from all connection with the rest of the air brake piping.

Proceeding now to a description of a typical operation, it should be noted that the accompanying diagrams have been devised with the object of making the functions of the various parts more clearly understood than with regard to their exact construction or arrangement. Let it be assumed, for example, that the selector valve has been set for high speed passenger equipment, so that the mechanism will give a heavy service application on receipt of the first brake actuating impulse and a quick-action application on receipt of the second brake actuating impulse.

Referring to Fig. 1 the apparatus is shown in the normal or clear condition. Main reservoir air enters chamber 1 of the differential valve via pipe 2 and passes thru the small metering holes 3 and 4 to chambers 5 and 6 respectively. Flow of air from chamber 5 to atmosphere via passage 7 and port 8 is prevented by vent valve 9, the coil of which is energized. Likewise vent valve 10 prevents flow of air from chamber 6 to atmosphere via passage 11 and port 12. Consequently the pressures in chamber 1, 5 and 6 will equalize to that of the main reservoir, the forces on the differential piston 13, therefore, will be balanced, and that member will be retained in the center position by the action of the helical springs 14 and 15. Due to the fact that the spring movement is limited by two shouldered sleeves the slide valve has a slight slack motion on the center. The area of its ports is sufficient to take care of this slack.

Port and passage 16 are open at all times to atmosphere, so that when the slide valve is centered port 17 communicates with atmosphere via passage 18 and cavity 19 on the differential slide. Port 17 is connected via passage 20 to the engineer's brake valve actuating mechanism previously mentioned; consequently no pressure is exerted on the brake valve motor pistons and the engineer has perfect freedom in the manual operation of this valve. Ports 21, 22 and 23 are lapped by the differential slide valve 34.

Equalizing reservoir or brake pipe air enters chamber 24 of the duplex service valve via passage 25 and flows thru the charging port 26 to capacity reservoir 27 and chamber 28. As the air pressure at each side of the duplex service valve piston is thus balanced, this unit is forced to the left or release position by the helical compression spring 29.

Chamber 30 of the quick-action valve communicates at all times with the brake pipe. Chamber 31 is open likewise at all times to atmosphere. Consequently, since there is no pressure in chamber 32, the valve is maintained closed under the combined action of spring 33 and brake pipe air.

On passing the first active application point and receiving a suitable impulse the primary vent valve 9 will be caused to operate, thus establishing communication between chamber 5 and atmosphere. The main reservoir air in this chamber will thus be exhausted to atmosphere faster than it can be supplied thru the metering hole 3. As a result an unbalanced pressure condition is established and the differential piston 13 and slide valve 34 will move to the left, as shown in Fig. 2. Main reservoir air will flow thru the slide valve ports 35 and 17 to passage 20 and, as explained in the said Frank J. Sprague application, Sr. No. 315,880 filed August 7th, 1919, will cause the engineer's brake valve to be moved to lap position. Similar movement of the engineer's brake valve to lap position is fully described in application, Ser. No. 879,939 filed December 31st, 1914, also by Frank J. Sprague which application corresponds with British Patent No. 18,213 of 1915.

When the engineer's rotary valve is in lap position all flow of air to the brake pipe or the equalizing reservoir is stopped. Equalizing reservoir or brake pipe air will now pass through the duplex service valve passage 36 to port 37 of the selector valve, thru cavity 38 to port 39 and to atmosphere via port 22, cavity 19 of the differential slide valve and port 16. As such a flow of air cannot take place without a reduction in pressure being established, air in chamber 28 will tend to flow thru charging port 26, but this flow will be small on account of the restricted opening 40 interposed between the two. At the same time this pressure reduction will cause the duplex service piston 41 to start to move to the right.

The first movement of this piston will cause the slide valve 42 to lap port 26, and consequently the pressure in chamber 28 and the capacity reservoir 27 will be retained at practically its initial value. (The expansion due to the movement of the duplex service piston is negligible on account of the size of the capacity reservoir). The discharge of equalizing reservoir or brake pipe air will continue until a sufficient reduction in pressure has been made to allow the service piston 41 to compress the helical spring 29 sufficiently so that the slide 42 will lap port 36 and cut off further flow. The strength of the spring and the length of the stroke, etc., are preferably so proportioned that this cut-off point insures about a 22 lb. reduction, to effect a full service application.

Should the primary vent valve 9 be reenergized it will cut off the discharge of main reservoir air from chamber 5 to atmosphere. Pressures in chambers 1 and 5 will equalize via the metering port 3 and the differential piston and slide valve will then return to center position due to the thrust of the compressed left hand helical spring 14. Communication between the engineer's brake valve actuating mechanism and atmosphere is accordingly re-established, with a consequent relief of thrust on the engineer's brake handle. The engineman may then manually release his brakes by moving the rotary to release or running positions, which will re-charge the brake pipe and equalizing reservoir. Capacity reservoir pressure will equalize with brake pipe.

This rise of pressure in chamber 24 of the duplex service valve, in conjunction with the thrust of the compressed helical cut-off spring 29, will move the piston 41 to the left so that slide 42 will uncover in succession ports 36, 46 and 26. The first two ports are ineffective for discharge, as they are in turn lapped by the differential slide 34. Uncovering of port 26, however, allows pressures on both sides of piston 41 to equalize.

Should a second active application point be passed and a second track impulse be received prior to the receipt of a clearing impulse the secondary vent valve 10 will open, and this will cause a discharge of pressure from chamber 6 at a rate greater than can be supplied through the metering hole 4, thus creating an unbalanced force which will move the differential piston 13 and slide valve 34 to the right hand position, as indicated in Fig. 3. This is obviously independent of a coincident opening of vent valve 9 because of the differential character of the piston. Main reservoir air enters passage 20 via port 17, and, as previously described, will cause a lapping of the engineer's rotary. The main reservoir air pressure will also flow thru the port 35 of the differential slide valve and port 21 to chamber 32 of the quick-action valve via passages 43, 44 and cavity 45 of the selector valve. This main reservoir air will depress the quick-action piston 47 and unseat the brake pipe valve 48. Brake pipe air will then be vented to atmosphere via chambers 30 and 31 and a quick-action application result.

Upon re-energizing the coil of the secondary vent valve 10 the pressures in chambers 1 and 6 will equalize and the differential piston 13 will re-center. The thrust on the engineer's brake valve will be released in the same manner as in the service application, while flow of air to chamber 32 will be cut off by the lapping of port 21. Piston 47 is made relatively loose-fitting so that the pressure existent in chamber 32 may leak off to atmosphere through a suitable port beneath the piston, thus permitting compression spring 33 to re-seat the quick-action valve. The apparatus is now in the normal position and the engineer may release the brakes manually.

When it is desired to effect only a light service application at the first active application point and a heavy service application at the second active application point, the selector valve is set in the position shown in Fig. 4. Ports 37 and 44 of the selector valve are now blanked, and ports 39 and 49 are caused to register with each other via cavity 38.

The effect of this change on the functioning of the apparatus is confined merely to the manipulation of the equalizing reservoir or brake pipe air via the duplex service valve and differential slide valve to accomplish the desired results. Therefore, in describing a complete cycle of operations with the above selector valve setting we may pass directly to the point where the engineer's brake valve has been lapped, following the leftward movement of the differential valve in response to a primary impulse, as the functioning of the apparatus from normal condition up to this point is substantially the same as described in the "Heavy service-emergency" cycle of operations.

With the engineer's rotary valve in lap position all flow of air to the brake pipe or equalizing reservoir is stopped. Equalizing reservoir air or brake pipe will now pass thru the duplex service valve port 46 to port 49 of the selector valve, thru cavity 38 to port 39, and to atmosphere via port 22 cavity 19 of the differential slide valve and port 16. As the equalizing reservoir or brake pipe pressure falls air will tend to flow from chamber 28 thru port 26, but this flow will be small because of the restriction 40. A differential pressure condition is therefore set up which starts piston 41 moving to the right. The first movement of the slide valve 42 laps port 26 and pressure in reservoir 27 and chamber 28 is trapped at practically its initial value. As the equalizing reservoir or brake pipe pressure continues to fall the differential pressure becomes greater and piston 41 is moved further to the right against the resistance of spring 29 until slide valve 42 laps port 46, cutting off further flow. The strength of the spring and the length of the stroke, etc., are preferably so proportioned that this cut-off point insures about a 10 lb. brake pipe reduction, but of course any value of cut-off may be provided. Re-energization of the primary vent valve will effect restoration of the apparatus to normal condition and permit release of the brakes in the same manner as previously explained.

Should a second active application point be passed prior to the receipt of a clearing impulse the secondary vent valve 10 will open causing the differential valve piston 13 to move to the right, with a consequent lapping of the engineer's rotary in substantially the same manner as previously explained. Equalizing reservoir or brake pipe air will now discharge thru port 36 of the duplex service valve to port 23 in the differential slide valve seat, thru cavity 19 in the slide valve and thence to atmosphere via port 16 in the differential slide valve seat.

The operation of the duplex service valve, following a reduction in equalizing reservoir or brake pipe pressure, having been heretofore fully described it is only necessary to state that the spring strength and travel have been so proportioned as to require about a 22 lb. or full service application of the brakes before slide 42 laps port 36.

The foregoing detailed description has been given for clearness of understanding, and no undue limitation should be deduced therefrom, but the appended claims should be construed as broadly as permissible in view of the prior art.

Having thus described my invention, what I claim as new, and desire to secure by Letters Patent, is:

1. In a train control system, the combination with an air brake equipment of a means capable of initiating variable brake applications in response to identical governing impulses received from the track and means for selectively determining the character and degree of brake applications initiated by said first mentioned means.

2. In a train control system, an automatic valve capable of making multiple service applications due to venting different but predetermined amounts of equalizing reservoir air to atmosphere.

3. In an automatic train control system, the combination with an air brake equipment embodying a brake pipe and an equalizing reservoir, of a vent device to reduce a controlling air pressure to effect an application of the brakes, an air storage reservoir charged from the source of said controlling air pressure, and a vent device having a piston with a connection from one side of the piston to the said storage reservoir, a connection from the other side of the piston to the source of said controlling air pressure and a third connection to the said vent device, and valve means actuated by the piston to control communication between said vent device and that side of the piston which communicates with the said source of controlling air pressure.

4. In an automatic train control system, the combination with an air brake equipment embodying a brake pipe and an equalizing reservoir of a vent device to reduce a controlling air pressure to effect an application of the brakes, an air storage reservoir charged from the source of said controlling air pressure, and a vent control device having a casing with a chamber and a piston therein and with a valve outlet at one side of the piston, which valve outlet is controlled by the piston, a connection from one side of the piston to the said storage reservoir, a connection between the said valve outlet and the other side of the piston with the source of said controlling air pressure, and a third connection from the discharge side of the valve outlet to the said vent device.

5. In an automatic train control system the combination with an air brake equipment of a brake application valve assembly comprising two electro-pneumatic vent valves, a differential valve embodying a differential cylinder and a piston and slide moving therein, a duplex cut-off valve capable of throttling an exhaust of controlling air pressure after two definite degrees of reduction initiated by the operation of the differential slide valve, and a brake pipe vent valve for venting brake pipe air in large volume direct to atmosphere.

6. In an automatic train control system the combination with an air brake equipment of a brake application valve assembly comprising two electro-pneumatic vent valves, a differential valve embodying a differential cylinder and a piston and slide moving therein, a duplex cut-off valve capable of throttling an exhaust of controlling air pressure after two definite degrees of reduction initiated by the operation of the differential slide valve, and a brake pipe vent valve for venting brake pipe air in large volume direct to atmosphere, together with manually operable means for varying the combination of brake applications initiated by said valve assembly.

7. In an automatic air brake assembly, the combination of two vent valves responding to successive track impulses, a differential valve operated thereby, a plurality of brake applying mechanisms, a selective means for determining which of said mechanisms shall respond to said impulses.

8. In an automatic air brake assembly, the combination of two vent valves responding to successive track impulses, a differential valve operated thereby, a plurality of brake applying mechanisms and means for varying the connections between said differential valve and said brake applying mechanisms.

9. In an automatic air brake assembly, the combination of a plurality of brake applying mechanisms for effecting different degrees of braking, and means for determining which differing combination of brake applying mechanisms will respond to two successive track impulses.

10. In an automatic air brake assembly, the combination of means for effecting a plurality of differing degrees of braking, and means for selectively determining which of two degrees of braking shall respond to each of two track impulses.

11. In an automatic air brake assembly, the combination of means for producing two degrees of limited service braking and an increased braking effort, and means for selectively determining which of two degrees of braking shall respond to a plurality of successive track impulses.

12. In an automatic air brake assembly, the combination of a plurality of vent valves responding to successive track impulses, a differential valve responding in opposite directions of movement to the opening of said vent valves and a brake applying means responding to the movement of said differential valve.

13. In an automatic air brake assembly, the combination of a plurality of vent valves responding to successive track impulses, a differential valve responding in opposite directions of movement to the opening of said vent valves and means for effecting a plurality of differing degrees of brake application responding to each movement of said differential control valve.

14. In an automatic air brake assembly, the combination of a plurality of vent valves responding to successive track impulses, a differential valve responding in opposite directions of movement to the opening of said vent valves, means for effecting three degrees of braking, and means for determining which of two degrees of braking shall be effected in response to like movements of the control valve.

15. In an automatic air brake assembly, the combination of a plurality of vent valves responding to two or more track impulses, an automatic service valve having two degrees of movement to effect different fixed reductions of brake pipe pressure regardless of brake pipe pressure variations, a quick-action valve to effect a maximum degree of braking, and means for determining whether the braking resulting from two track impulses shall be both of limited service character or one of limited service character and the other of maximum braking character.

16. In a train control system comprising a brake pipe and means for charging the brake pipe including a main reservoir, the combination of a differential piston having opposite faces of different areas normally subjected to main reservoir pressure, a cylinder in which the differential piston reciprocates, mechanism operable by the differential piston for effecting a drop in brake pipe pressure on movement of the differential piston, and means for changing the normal pressure conditions on the differential piston to effect said movement.

17. In a train control system comprising a brake pipe and means for charging the brake pipe including a main reservoir, the combination of a differential piston having opposite faces of different areas normally subjected to main reservoir pressure, a cylinder in which the differential piston reciprocates, mechanism operable by the differential piston for effecting a drop in brake pipe pressure on movement thereof, a normally closed valve for exhausting main reservoir pressure on one of the faces of said piston for effecting said movement on opening of said valve, a normally energized coil for maintaining said valve closed and means for effecting the deenergization of said coil.

18. In a train control system comprising a brake pipe and means for charging the brake pipe including a main reservoir, the combination of a differential piston having opposite faces of different areas normally subjected to main reservoir pressure, a cylinder in which the differential piston reciprocates, mechanism operable by the differential piston for effecting a drop in brake pipe pressure on movement of the piston in a direction toward its face of larger area and means for effecting a discharge of main reservoir pressure on said face of larger area to effect said movement.

19. In a train control system comprising a brake pipe and means for charging the brake pipe including a main reservoir, the combination of a differential piston having opposite faces of different areas normally subjected to main reservoir pressure, a cylinder in which the differential piston reciprocates, mechanism operable by the differential piston for effecting a drop in brake pipe pressure on movement of the piston in a direction toward its face of larger area, a normally closed valve for effecting when opened a discharge of main reservoir pressure on the face of the piston of larger area, a normally energized coil for maintaining said valve closed and means for deenergizing said coil.

20. In a train control system comprising a brake pipe and means for charging the brake pipe including a main reservoir, the combination of a differential piston having opposite faces of different areas normally subjected to main reservoir pressure, a cylinder in which the differential piston reciprocates, mechanism operable by the differential piston for effecting a drop in brake pipe pressure on movement of the piston in a direction toward its face of smaller area, a normally closed valve for effecting when opened a discharge of main reservoir pressure on the face of the piston of smaller area, a normally energized coil for maintaining said valve closed and means for deenergizing said coil.

21. In a train control system comprising a brake pipe and means for charging the brake pipe including a main reservoir, the combination of a differential piston having opposite faces of different area normally subjected to main reservoir pressure, a cylinder in which the differential piston reciprocates, brake applying means, means controlled by said piston co-operating with the brake applying means to cause a service application of the brakes when the piston is moved in the direction toward its face of smaller area and means for changing the normal pressure conditions on the differential piston to effect said movement.

22. In a train control system comprising a brake pipe and means for charging the brake pipe including a main reservoir, the combination of a differential piston having opposite faces of different areas normally subjected to main reservoir pressure, a cylinder in which the differential piston reciprocates, brake applying means, means controlled by said piston co-operating with the brake applying means to cause an emergency application of the brakes when the piston is moved in the direction toward its face of larger area and means for changing the normal pressure conditions on the differential piston to effect said movement.

23. In a train control system comprising a brake pipe and means for charging the brake pipe, including a main reservoir, the combination of a differential piston having opposite faces of different areas, both normally subjected to main reservoir pressure, a cylinder in which the differential piston reciprocates under the pressure applied to said faces, a brake applying means, means controlled by said piston in cooperation with a brake applying means to cause a service application of the brakes when the piston is moved in the direction towards the face of larger area, and means for changing from normal the pressure relation on the faces of the differential piston to effect such movement.

24. In a train control system comprising a brake pipe and means for charging the brake pipe, including a main reservoir, the combination of a differential piston having opposite faces of different areas, both normally subjected to main reservoir pressure, a cylinder in which the differential piston reciprocates under the pressure applied to said faces, a brake applying means, means controlled by said piston in cooperation with a brake applying means to cause a service application of the brakes when the piston is reciprocated in either direction, and means for changing from normal the pressure relation on the faces of the differential piston to effect such movements.

25. In a train control system comprising a brake pipe and means for charging the brake pipe, including a main reservoir, the combination of a differential piston having opposite faces of different areas, both normally subjected to main reservoir pressure, a cylinder in which the differential piston reciprocates under the pressure applied to said faces, a brake applying means, means controlled by said piston in cooperation with a brake applying means to cause a service application of the brakes of one amount when the piston is reciprocated towards its face of smaller area and a brake application of larger amount when reciprocated towards its face of larger area, and means for changing from normal the pressure relation on the faces of the differential piston to effect such movements.

26. In a train control system comprising a brake pipe and means for charging the brake pipe, including a main reservoir, the combination of a differential piston having opposite faces of different areas, both normally subjected to main reservoir pressure, a cylinder in which the differential piston reciprocates under the pressure applied to said faces, a brake applying means, means controlled by said piston in cooperation with a brake applying means to cause two degrees of service application of the brakes when the piston is reciprocated towards its face of smaller area, and means for changing from normal the pressure relation on the faces of the differential piston to effect such movement.

27. In a train control system comprising a brake pipe and means for charging the brake pipe, including a main reservoir, the combination of a differential piston having opposite faces of different areas, both normally subjected to main reservoir pressure, a cylinder in which the differential piston reciprocates under the pressure applied to said faces, a brake applying means, means controlled by said piston in cooperation with a brake applying means to cause two degrees of application of the brakes when the piston is reciprocated towards its face of larger area, and means for changing from normal the pressure relation on the faces of the differential piston to effect such movement.

28. In a train control system comprising a brake pipe and means for charging the brake pipe, including a main reservoir, the combination of a differential piston having opposite faces of different areas, both normally subjected to main reservoir pressure, a cylinder in which the differential piston reciprocates under the pressure applied to said faces, a brake applying means, means controlled by said piston in cooperation with a brake applying means to cause either of two degrees of service application of the brakes when the piston is reciprocated towards its face of smaller area, and either of two degrees of application of the brakes, including an emergency application, when the piston is reciprocated towards its face of larger area, and means of changing from normal the pressure relation of the faces of the differential piston to effect such movements.

29. In a train control system comprising a brake pipe, and means for charging the brake pipe, including a main reservoir, the combination of a differential piston having opposite faces of different areas normally subjected to main reservoir pressure, a cylinder in which the differential piston reciprocates, mechanism operable by the differential piston for effecting a drop in brake pipe pressure on movement of the differential piston, means for changing from normal the pressure relation on the faces of the differential piston to effect a reciprocation of the piston, and means for restoring the differential piston to its normal position on restoration of main reservoir pressure to the opposite faces of the piston.

FRANK DESMOND SPRAGUE.